(No Model.)
J. M. WATSON.
SHAFT COUPLING.
No. 297,652. Patented Apr. 29, 1884.
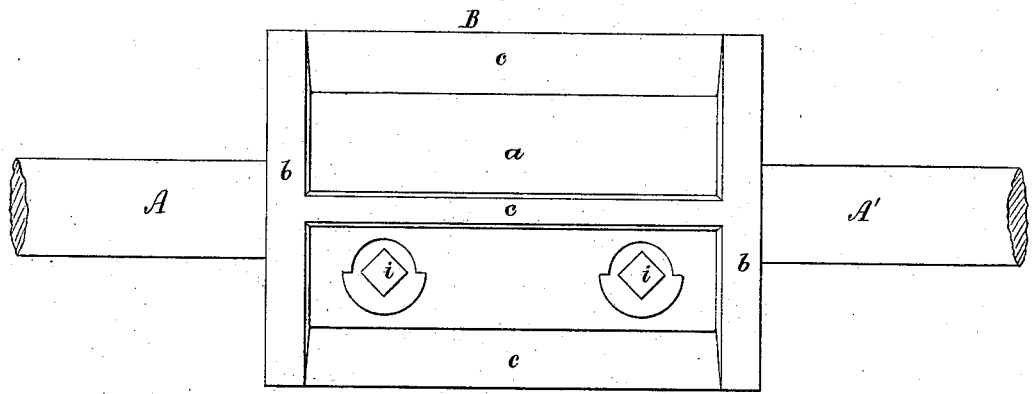
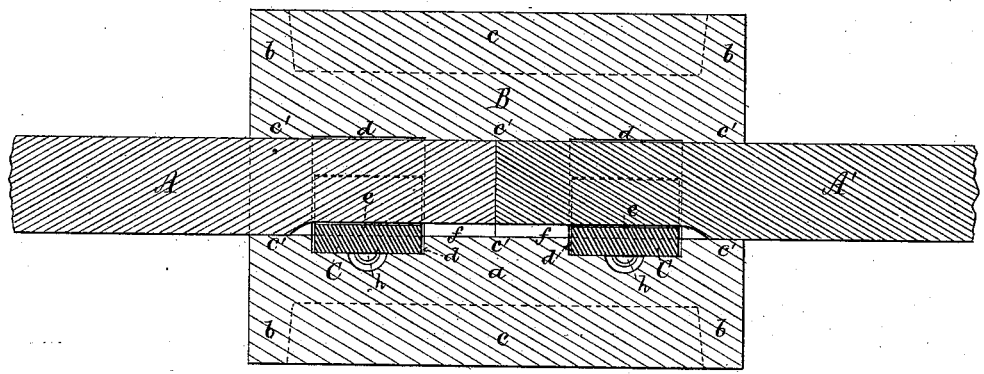
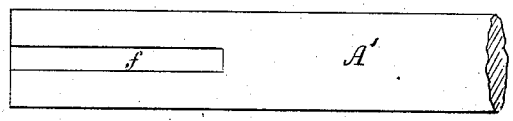
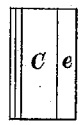
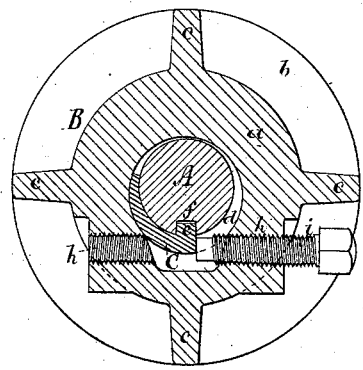
Witnesses
S. N. Piper
E. B. Pratt
Inventor.
Jeremiah Mears Watson
by R. H. Eddy atty.

UNITED STATES PATENT OFFICE.

JEREMIAH MEARS WATSON, OF SHARON, MASSACHUSETTS.

SHAFT-COUPLING.

SPECIFICATION forming part of Letters Patent No. 297,652, dated April 29, 1884.

Application filed November 1, 1883. (No model.)

*To all whom it may concern:*

Be it known that I, JEREMIAH MEARS WATSON, of Sharon, in the county of Norfolk, of the Commonwealth of Massachusetts, have invented a new and useful Improvement in Shaft-Couplings; and I do hereby declare the same to be described in the following specification and represented in the accompanying drawings, of which—

Figure 1 is a side view, and Fig. 2 a longitudinal section, of two shafts connected by a coupling containing my invention. Fig. 3 is a transverse section taken through one of the eccentric chambers and its screws, to be explained. Fig. 4 is a top view of one of the shafts, showing its groove for receiving the spline of the curved wedge. Fig. 5 is a top view, and Fig. 6 an end view of the said wedge.

The nature of my invention is defined in the claims hereinafter presented.

In the drawings, A and A' denote the shafts, and B their connecting or coupling sleeve. As shown, this sleeve has a cylindrical or tubular body, $a$, flanged at its opposite ends, as represented at $b\,b$, and having the flanges and body strengthened by a series of ribs, $c$, projecting radially from the body and extending from one to the other of the flanges, and in one piece therewith and the body. This construction of the sleeve or box, though advantageous, is not essential to my invention, as any other suitable thereto may be employed. Within the sleeve, near one or each end of it, is a cylindrical chamber, $d$, which is eccentric with the bore $c'$ of the sleeve, such bore being of a diameter corresponding to that of each of the shafts. Furthermore, there is in each of such eccentric chambers, and arranged, as shown, against the periphery of the shaft extending through such chamber, a curved wedge, C, which, as represented, is provided with a spline or feather, $e$, to enter a groove, $f$, made in the shaft at or near its inner end. This spline and groove so connect the wedge to the shaft as to cause such wedge to be moved with the shaft while the latter may be in the act of being revolved in the sleeve. By so turning the shaft the wedge becomes firmly wedged between the shaft and the periphery of the chamber, so as to cause the sleeve to revolve with the shaft. Leading into each eccentric chamber from the outer surface of the sleeve, and in line with each other, are two holes, $h$, each of which is screw-threaded to receive a screw, $i$. This screw inserted in one of the holes bears against the head or larger end of the wedge, in order to prevent back slipping of the wedge in case of the shaft being revolved in a direction the reverse of that necessary to cause the wedge to be forced forward in the chamber. According to the direction in which the shaft is to be revolved is the screw to be inserted in one of the screw-threaded holes. In which of the two directions the shafts are to revolve, the wedge is to point in such direction in the eccentric chamber. It will be seen that when the two shafts are inserted in the sleeve in line with each other and through its two eccentric chambers in manner as represented, and there is in each of such chambers and to each shaft a curved wedge, C, each shaft, on being revolved so as to advance the wedge smaller end foremost in its chamber, will move the wedge until it may become choked in the crescental space between the shaft and periphery of the chamber. This having taken place, the shaft and sleeve will be coupled together. Thus, by means of the sleeve provided with the two eccentric chambers and the two curved wedges, the coupling of one shaft to the other can be easily and strongly effected.

In case the sleeve may be intended to have but one shaft coupled to it, as would be the case were such sleeve to be a wheel or other device, or the hub of a wheel or pulley provided with a bore to receive the shaft, there need be in the sleeve but one eccentric chamber and one curved wedge.

In some instances the wedge may be without the spline or feather, and the shaft be without the groove to receive such spline or feather, the advance movement of the wedge in the eccentric chamber being then due to the friction of the shaft on it, (the said wedge.)

I do not claim a shaft-coupling in which the sleeve is provided in its bore with two independent tapering grooves or seats, each deeper at one than at its other end, and both separated by a central chamber or enlargement of the bore of the sleeve, and having the deepest part or end of one groove opposite the shallowest part or end of the other groove, and also having an arc-shaped wedge in each of such tapering grooves or seats to operate with, to couple them together, two shaft-sections when extended in opposite directions into the sleeve; nor do I claim in connection with such devices a single screw-hole extended through the sleeve from the deeper end of each of such grooves or seats.

I claim—

1. The combination of the shaft-coupling sleeve, having within it and arranged, as described, with its bore, a cylindrical chamber eccentric therewith, substantially as explained, with a curved wedge placed in such chamber, and to operate with a shaft when in the bore, essentially and for the purpose as set forth.

2. The shaft-coupling sleeve having within it and arranged with its bore a cylindrical chamber, essentially in manner as described, and also having two screw-threaded openings arranged to lead into such chamber in manner as set forth, in combination with a curved wedge arranged in such chamber, and with a screw screwed into one of such openings and to operate against the head of the said wedge, substantially as represented.

3. The combination of the shaft, grooved or recessed in its periphery at or near one end of it, with a curved wedge lapping about such shaft, and having a spline or feather extending from it into the groove or recess of the shaft, and with a sleeve having within it a chamber eccentric with the bore of such shaft, and applied to the shaft and wedge, substantially as set forth.

4. The combination of a sleeve having within it two cylindrical chambers eccentric with its bore, and in each chamber a curved wedge having a spline or feather, as described, with two shafts grooved or recessed in their peripheries to receive the splines or feathers of the said wedges, and extended in opposite directions into the bore of such sleeve and into or through the two eccentric chambers, and arranged with the wedges, as set forth.

JEREMIAH MEARS WATSON.

Witnesses:
R. H. EDDY,
E. B. PRATT.